US011349716B2

(12) United States Patent
Vasseur et al.

(10) Patent No.: US 11,349,716 B2
(45) Date of Patent: May 31, 2022

(54) FLASH CLASSIFICATION USING MACHINE LEARNING FOR DEVICE CLASSIFICATION SYSTEMS

(71) Applicant: Cisco Technology, Inc., San Jose, CA (US)

(72) Inventors: Jean-Philippe Vasseur, Saint Martin D'uriage (FR); Grégory Mermoud, Veyras (CH); Pierre-André Savalle, Rueil-Malmaison (FR); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/878,780

(22) Filed: May 20, 2020

(65) Prior Publication Data

US 2021/0367847 A1 Nov. 25, 2021

(51) Int. Cl.
*H04L 41/0893* (2022.01)
*H04L 41/12* (2022.01)
*H04L 9/40* (2022.01)
*H04L 101/622* (2022.01)
*H04L 43/12* (2022.01)

(52) U.S. Cl.
CPC .......... *H04L 41/0893* (2013.01); *H04L 41/12* (2013.01); *H04L 43/12* (2013.01); *H04L 61/6022* (2013.01); *H04L 63/1458* (2013.01); *H04L 63/20* (2013.01)

(58) Field of Classification Search
CPC ..... H04L 41/0893; H04L 41/12; H04L 43/12; H04L 61/6022; H04L 63/1458; H04L 63/20
See application file for complete search history.

(56) References Cited

U.S. PATENT DOCUMENTS 9,838,278 B2 12/2017 Chadha et al.
10,425,242 B2 * 9/2019 Berdy ..................... H04L 63/08
10,440,577 B1 10/2019 Vasseur et al.
(Continued)

OTHER PUBLICATIONS

Meidan, et al., "ProfilIoT: A Machine Learning Approach for IoT Device Identification Based on Network Traffic Analysis", SAC'17, Apr. 2017, 4 pages, ACM.
(Continued)

*Primary Examiner* — Sm A Rahman
(74) *Attorney, Agent, or Firm* — Behmke Innovation Group LLC; Kenneth J. Heywood; Jonathon P. Western

(57) ABSTRACT

In various embodiments, a device classification service makes a determination that an endpoint device in a network is eligible for expedited device classification based on a policy. The device classification service obtains, after making the determination that the endpoint device in the network is eligible for expedited device classification, telemetry data regarding the endpoint device generated by actively probing the endpoint device. The device classification service determines whether the telemetry data regarding the endpoint device matches any existing device classification rules. The device classification service generates, based on the telemetry data, a device classification rule that assigns a device type to the endpoint device, when the telemetry data does not match any existing device classification rules.

20 Claims, 9 Drawing Sheets

(56) References Cited

U.S. PATENT DOCUMENTS

| | | | |
|---|---|---|---|
| 2005/0240745 A1* | 10/2005 | Iyer | G06F 12/0607 |
| | | | 711/167 |
| 2011/0022517 A1* | 1/2011 | Hammad | G06Q 20/12 |
| | | | 705/44 |
| 2015/0220873 A1* | 8/2015 | Shaphy | G06Q 10/063114 |
| | | | 705/7.15 |
| 2016/0073482 A1* | 3/2016 | Fok | H05B 47/175 |
| | | | 315/294 |
| 2016/0373588 A1* | 12/2016 | Raleigh | H04M 15/61 |
| 2019/0158353 A1* | 5/2019 | Johnson | H04L 61/2514 |
| 2019/0253319 A1 | 8/2019 | Kampanakis et al. | |
| 2020/0127892 A1 | 4/2020 | Savalle et al. | |

OTHER PUBLICATIONS

T'Joens, et al., "DHCP Reconfigure Extension", Network Working Group, Request for Comments 3203, Dec. 2001, 6 pages, The Internet Society.

* cited by examiner

FLASH CLASSIFICATION USING MACHINE LEARNING FOR DEVICE CLASSIFICATION SYSTEMS

TECHNICAL FIELD

The present disclosure relates generally to computer networks, and, more particularly, to flash classification using machine learning for device classification systems.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by passively observing the behavior of the device for some period of time and applying a device classification rule to the collected data. In certain circumstances, however, this process is viewed as taking too long, both from the perspective of classifying a particular device, as well as generating new device classification rules for devices of unknown types.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
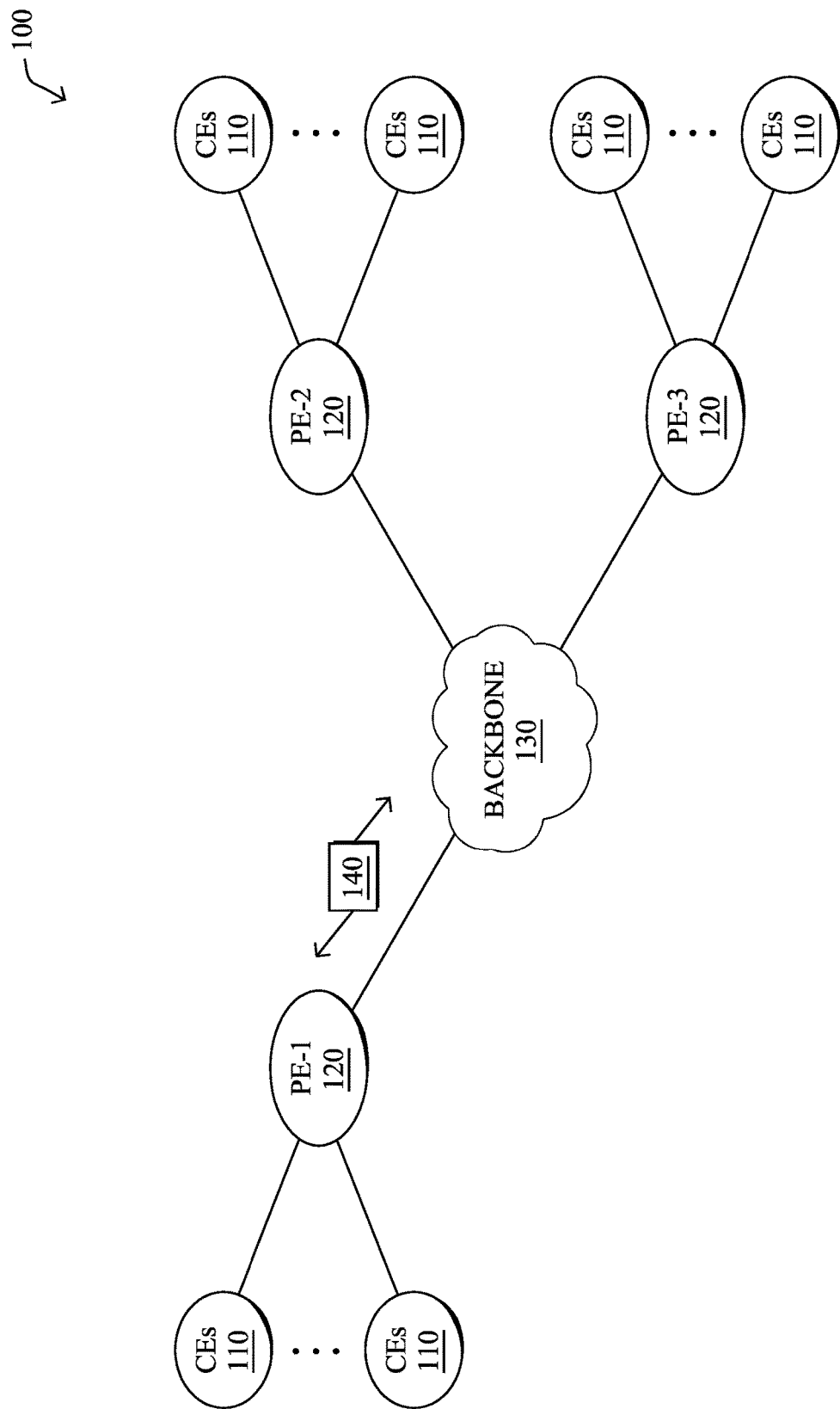
FIGS. 1A-1B illustrate an example communication network.

According to one or more embodiments of the disclosure, a device classification service makes a determination that an endpoint device in a network is eligible for expedited device classification based on a policy. The device classification service obtains, after making the determination that the endpoint device in the network is eligible for expedited device classification, telemetry data regarding the endpoint device generated by actively probing the endpoint device. The device classification service determines whether the telemetry data regarding the endpoint device matches any existing device classification rules. The device classification service generates, based on the telemetry data, a device classification rule that assigns a device type to the endpoint device, when the telemetry data does not match any existing device classification rules.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
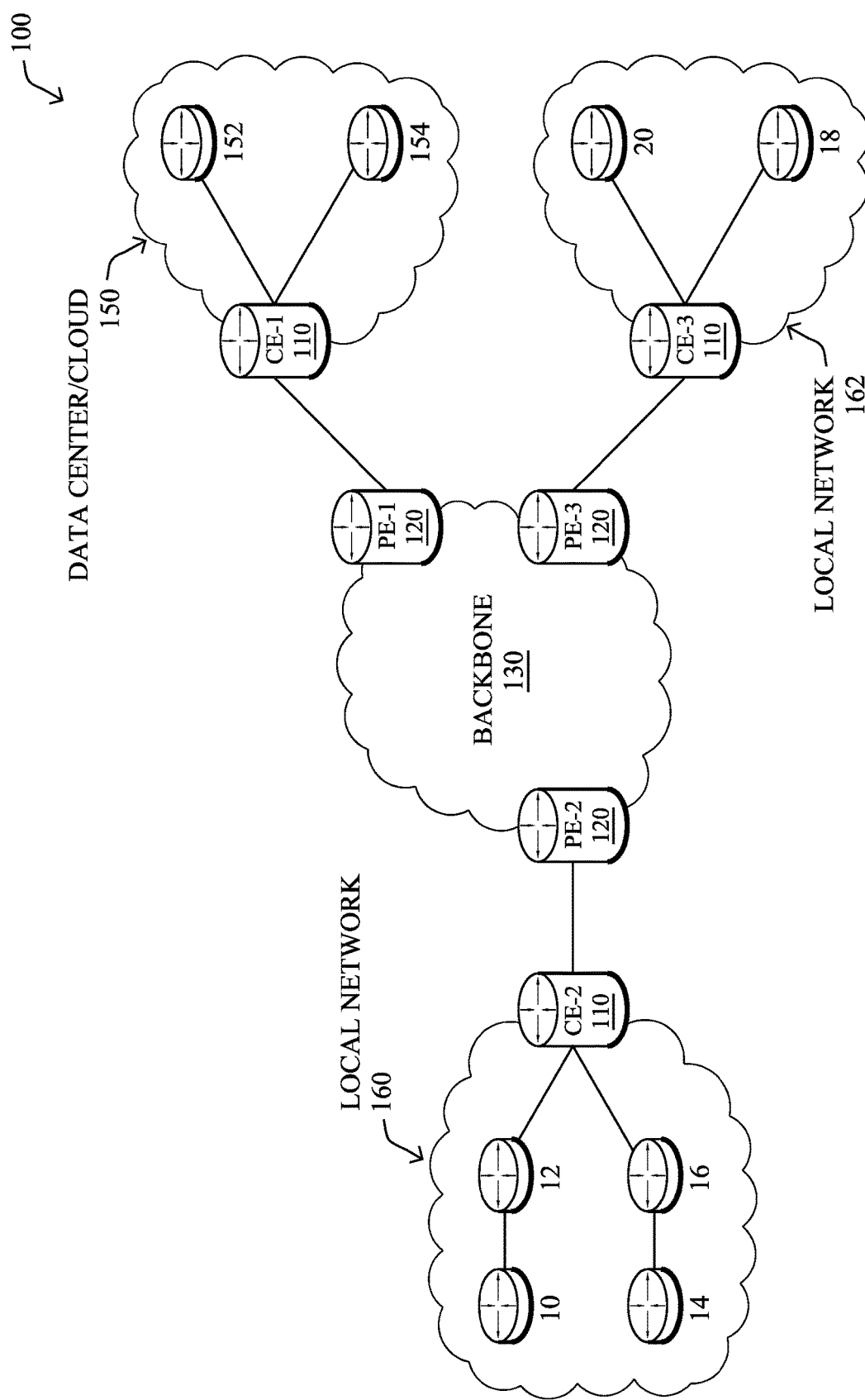

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
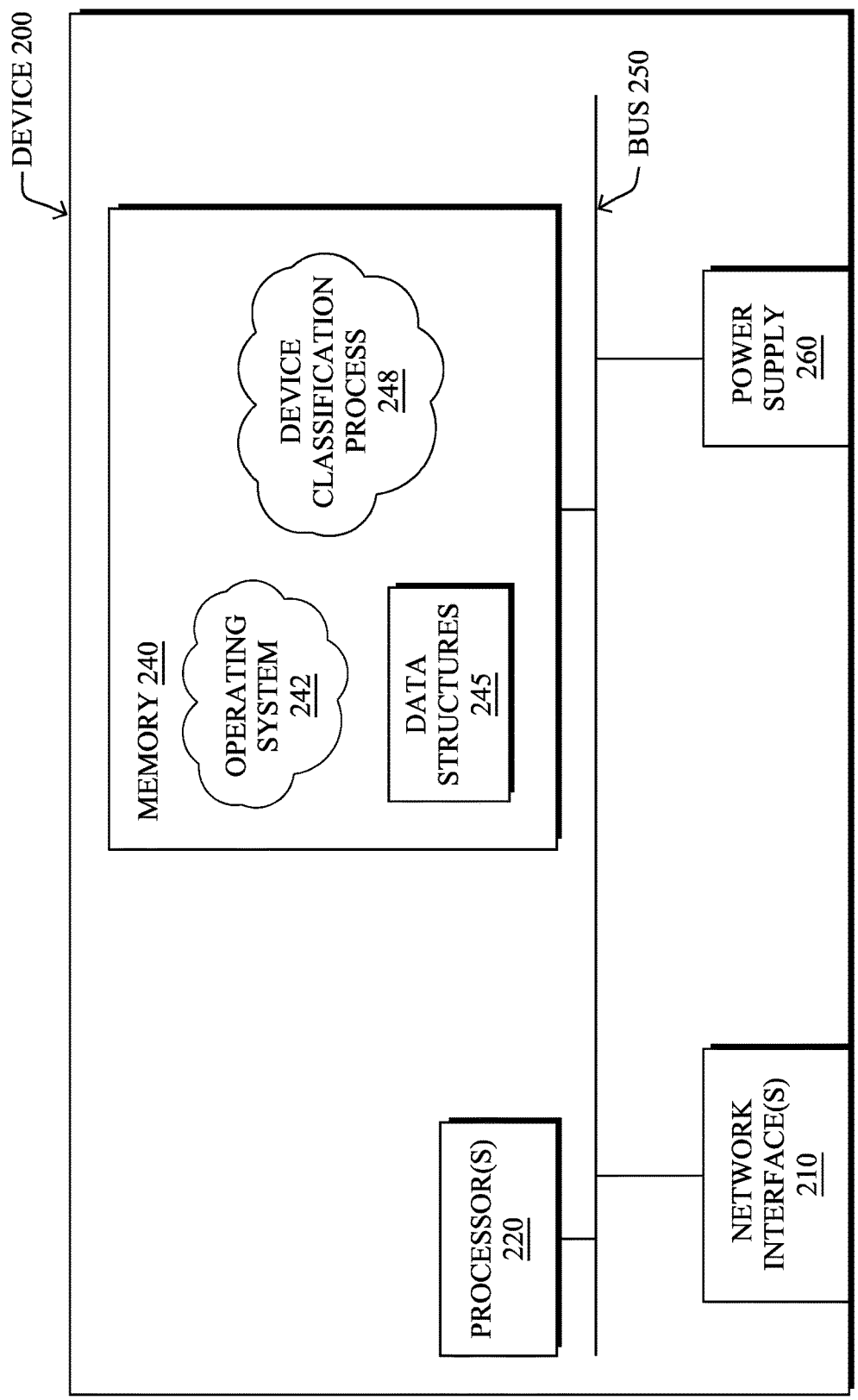
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
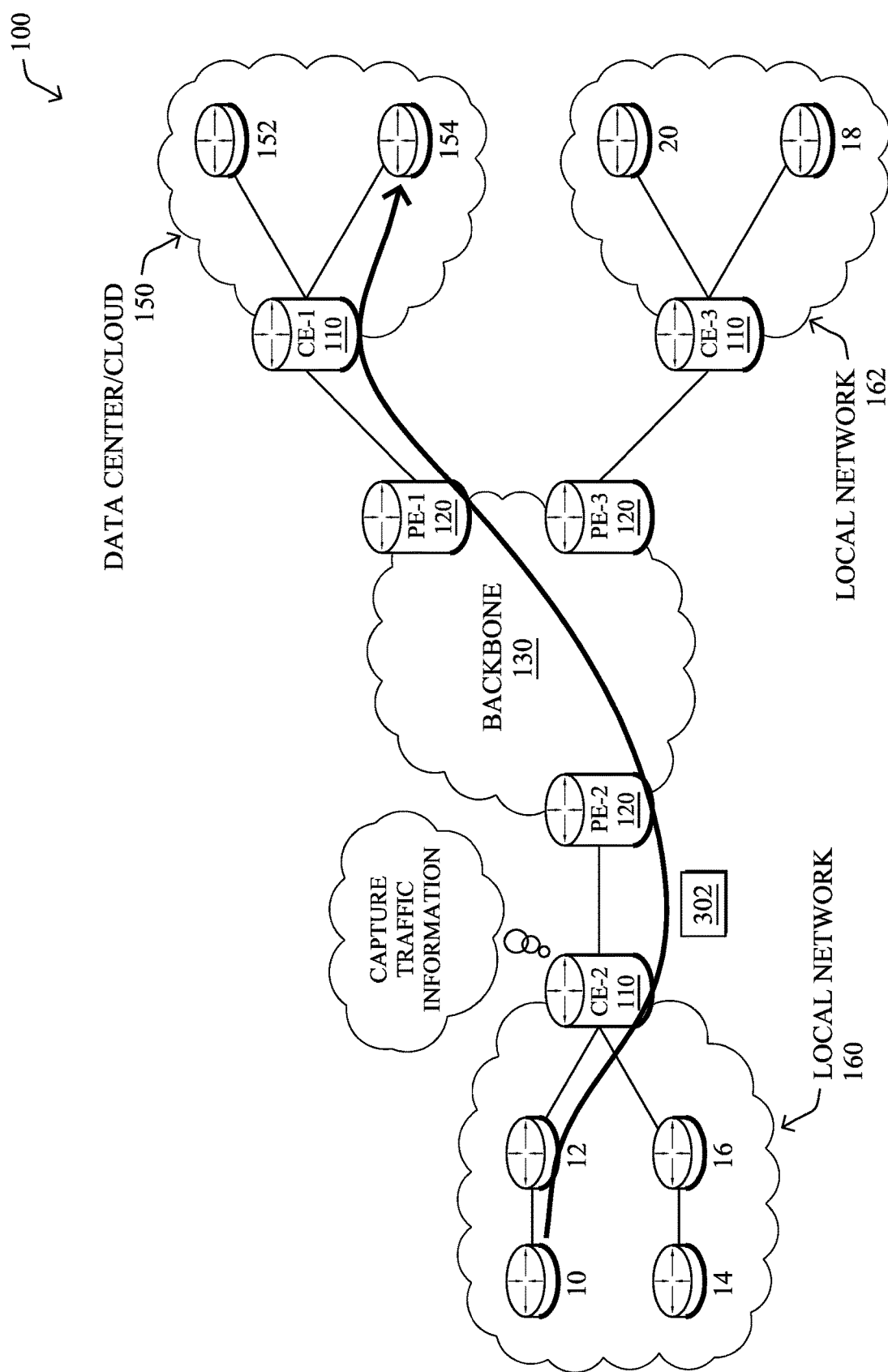
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
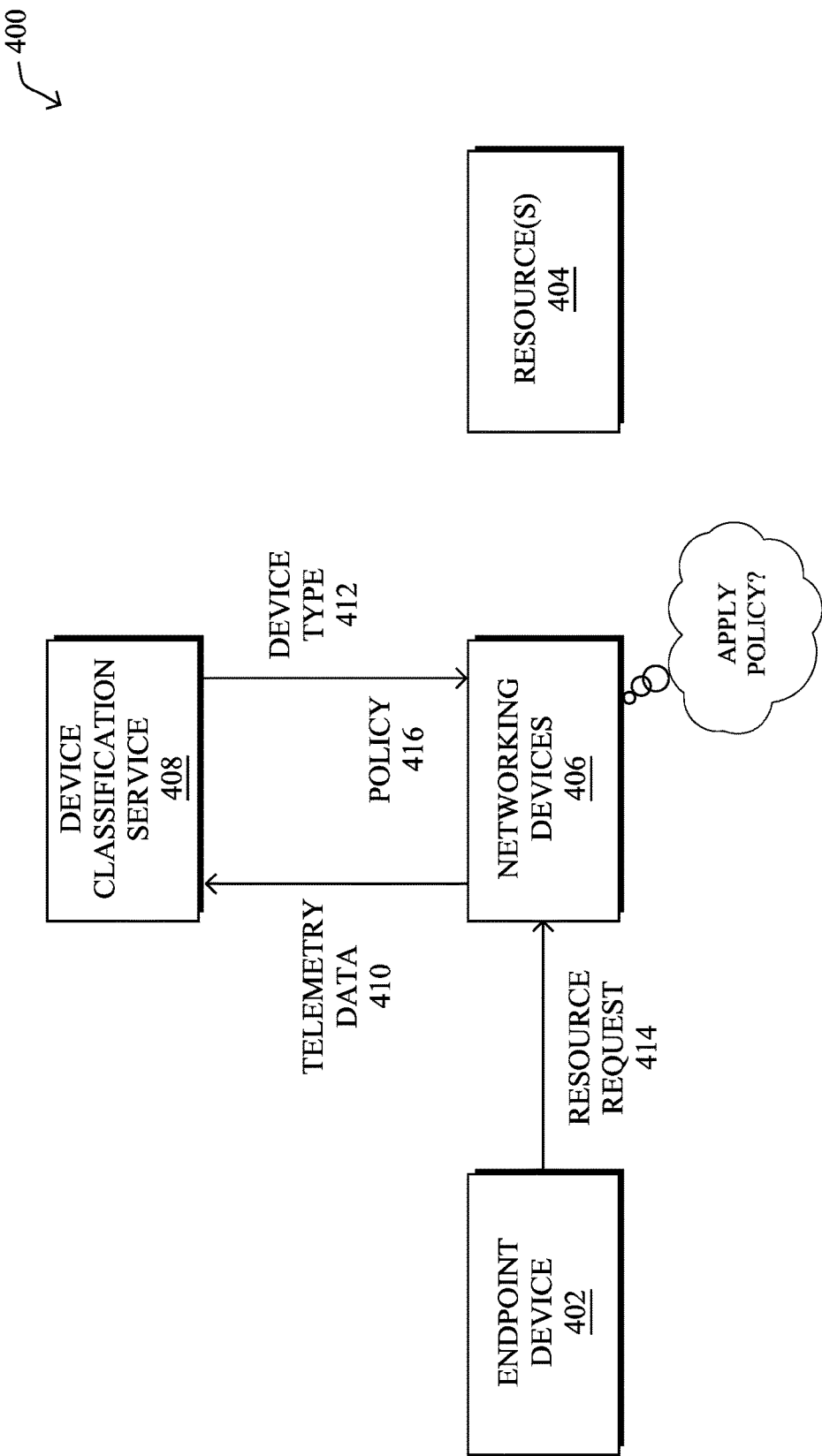
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that comprises one or more servers or other devices, such as networking devices 406, or be in communication therewith (e.g., in a data center, in the cloud, etc.). Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:
- DHCP probes with helper addresses
- SPAN probes, to get messages in INIT-REBOOT and SELECTING states, use of ARP cache for IP/MAC binding, etc.
- Netflow probes
- HTTP probes to obtain information such as the OS of the device, Web browser information, etc.
- RADIUS probes
- SNMP to retrieve MIB object or receives traps
- DNS probes to get the Fully Qualified Domain Name (FQDN)
- etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
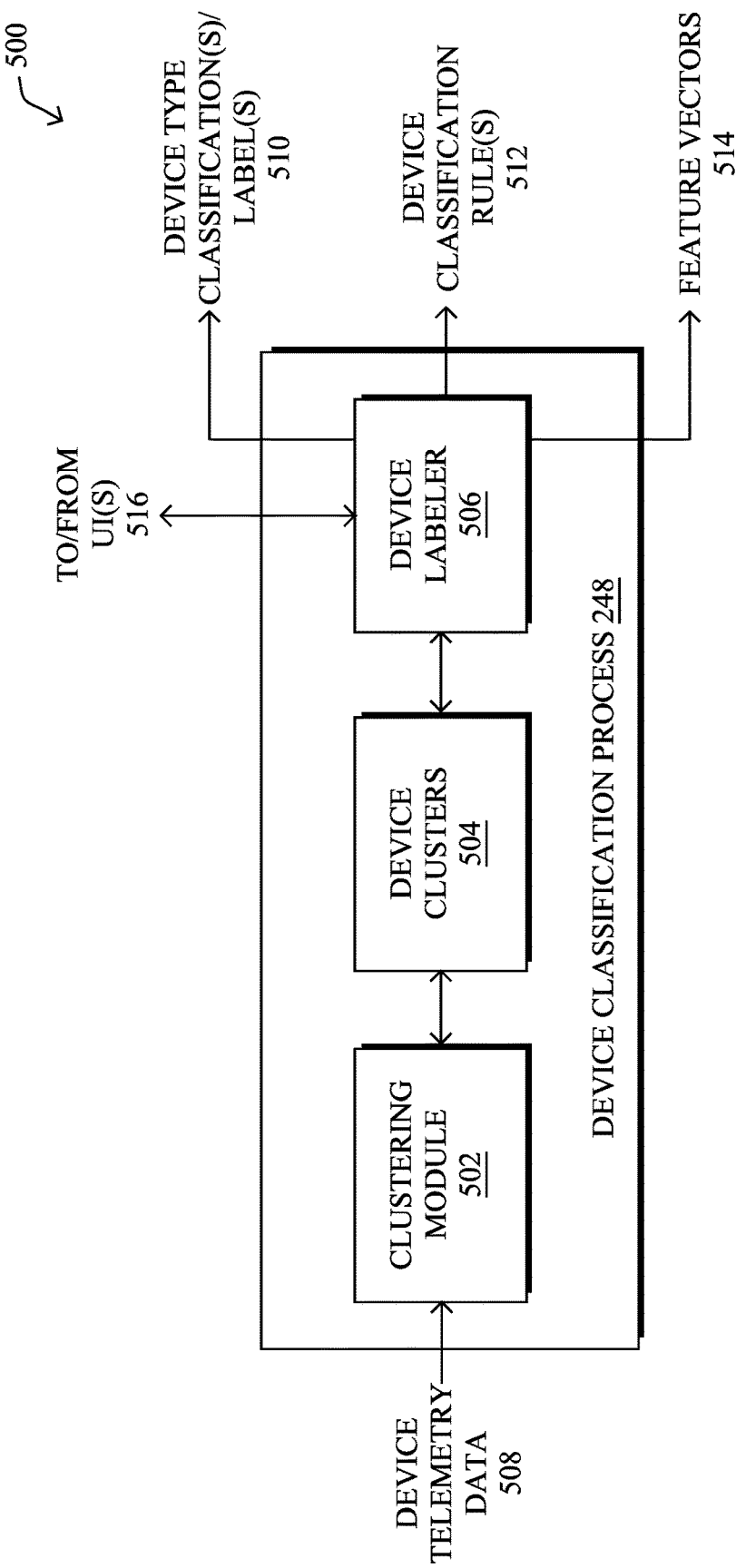
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification/label 510. In cases in which device labeler 506 is unable to classify the cluster 504 with sufficient confidence, it may send a label request to one or more user interfaces (UIs) 516, seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors/attributes as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks, etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc. For example, the following device classification rule 512 may label and endpoint device as an "Apple iPad," if the following conditions are met:

(OUI='Apple') && (DHCP-vendor-class-ID contains 'iPAD')

As noted above, in certain circumstances, the process of classifying a device through passive observation of their behaviors and/or creating new device classification rules for devices of unknown types may be seen as being too slow. Indeed, passively observing the characteristics/features of an endpoint device for purposes of classifying it can take a non-negligible amount of time. In addition, it fairly common for a set of new endpoint devices joining a network to have no corresponding device classification rule, while still being easily identifiable on the network as being part of the set (e.g., based on their MAC addresses, etc.).

——Flash Classification Using Machine Learning for Device Classification Systems——

The techniques herein allow a device classification system to perform 'flash' classifications using machine learning. In some aspects, explicit signaling is used to request the activation of flash classification, although implicit signaling can also be used. If the request is acceptable according to a defined policy, a set of mechanisms may be activated in the network so as to perform fast probing of the endpoint device using explicit probing techniques (e.g., NMAP port scan, DUCT lease renewal, packet captures on a switch or router, etc.). In further aspects, the resulting telemetry can be combined and active labeling leveraged to classify the endpoint device by its type.

Specifically, according to various embodiments herein, a device classification service makes a determination that an endpoint device in a network is eligible for expedited device classification based on a policy. The device classification service obtains, after making the determination that the endpoint device in the network is eligible for expedited device classification, telemetry data regarding the endpoint device generated by actively probing the endpoint device. The device classification service determines whether the telemetry data regarding the endpoint device matches any existing device classification rules. The device classification service generates, based on the telemetry data, a device classification rule that assigns a device type to the endpoint device, when the telemetry data does not match any existing device classification rules.

Illustratively, the techniques described herein may be performed by hardware, software, and/or firmware, such as in accordance with device classification process 248, which may include computer executable instructions executed by the processor 220 (or independent processor of interfaces 210) to perform functions relating to the techniques described herein.

Figure 6:
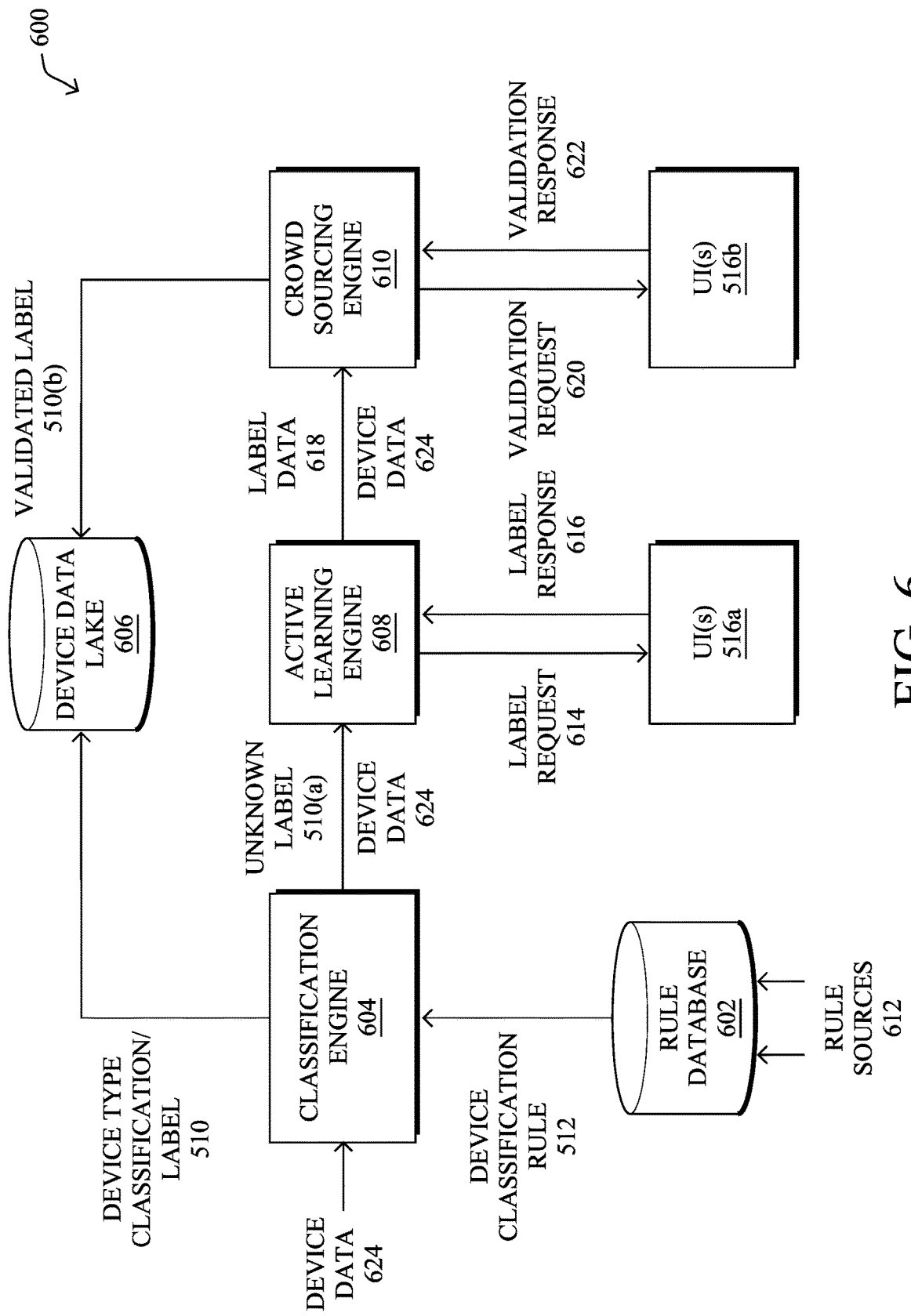
FIG. 6 illustrates an example architecture to label an endpoint device.

Operationally, FIG. 6 illustrates an example architecture 600 to label an endpoint device, according to various embodiments. For instance, device labeler 506 in FIG. 5 may be implemented using architecture 600. As shown, architecture 600 may include any or all of the following components: a rule database 602, a classification engine 604, a device data lake 606, an active learning engine 608, and/or a crowd sourcing engine 610. As would be appreciated, these components may be executed on a singular device/apparatus (e.g., device 200) or in a distributed manner, in which case the set of executing devices, whether located in the network undergoing monitoring or in the cloud, may be viewed as a singular device implementing the techniques herein. In addition, the functionalities of these components may be combined or omitted, as desired, in further embodiments.

As shown, rule database 602 may function as a repository for device classification rule used in any number of networks to classify devices in those networks by their types. In some cases, at least a portion of the device classification rules in rule database 602 may be received from any number of rule sources 612, such as Fingerbank, Zingbox, Identity Services Engine (ISE) from Cisco Systems, Inc., or from any other services that may maintain their own pools of device classification rules. Typically, these rules are manually defined and curated by experts in their respective networks. In addition to, or in lieu thereof, rule database 602 may also include any device classification rule generated using machine learning, such as by leveraging the techniques described previously with respect to FIG. 5.

During execution, classification engine 604 may receive device data 624 regarding an endpoint device, such as its associated telemetry data or data derived therefrom, and attempt to match device data 624 to any of the device classification rules 512 from rule database 602. In further cases, device data 624 may also include any device cluster information for the endpoint device, if clustering was also performed by the device classification service. If there is a rule match, classification engine 604 may provide the resulting device classification/label 510 for the device for storage in device data lake 606. However, if device data 624 does not match any of the existing device classification rules 512, classification engine 604 may provide device data 624 and a device label 510(*a*) that indicates that the endpoint device is of an 'unknown' device type to active learning engine 608.

In general, active learning engine 608 functions to request manual labeling of an endpoint device whose device type is unknown. To this end, active learning engine 608 may send a label request 614 to a set of one or more UIs 516a that includes device data 624 (e.g., contextual data), thereby requesting the user(s) label the endpoint device with a type. In turn, active learning engine 608 may receive a label response 616 that labels the endpoint device as being of a particular type.

In some embodiments, architecture 600 may also leverage crowd sourcing for purposes of labeling endpoint devices. For instance, as shown, crowd sourcing engine 610 may receive the label data 618 and device data 624 from label response 616 and send out a validation request 620 to any number of a set of UIs 516b. In turn, each user may send a validation response 622 that either validates or refutes the label supplied in label response 616. If the label is validated, crowd sourcing engine 610 may provide the validated label 510(b) for storage in device data lake 606, which can be used to apply one or more policies to the endpoint device based on its device type.

While the mechanisms of architecture 600 are able to eventually assign a device type to an endpoint device that does not match any existing device classification rule 512, it is still a relatively slow process, in some instances. Accordingly, 'flash' classification techniques are also introduced herein to perform expedited device classification on some endpoint devices, if eligible. While flash classification could be performed on all endpoint devices, in some embodiments, doing so also increases the overhead on the network and its supporting services and is not necessary for all endpoint devices.

Figure 7:
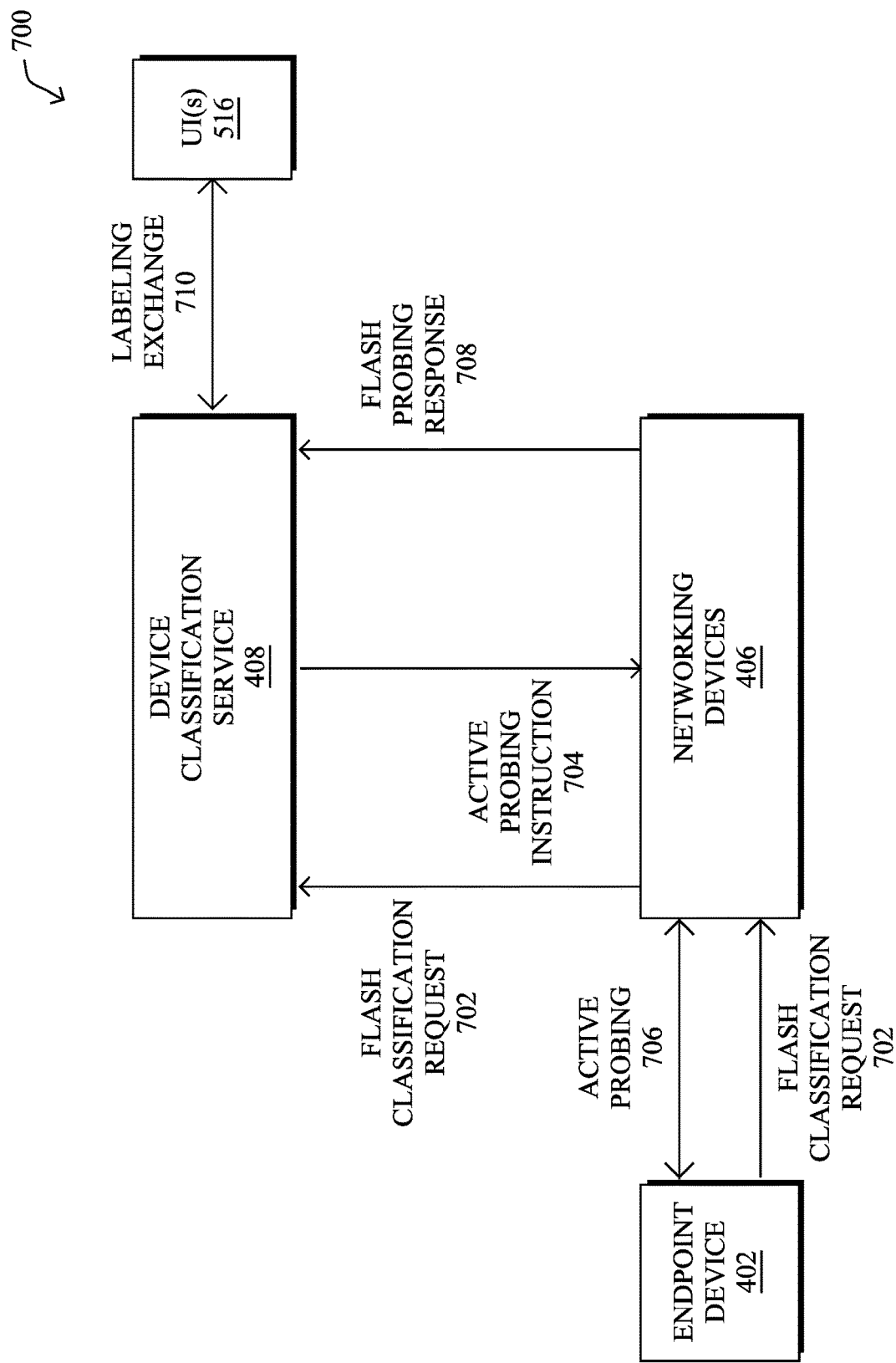
FIG. 7 illustrates an example of the flash classification of an endpoint device.

FIG. 7 illustrates an example 700 of the flash classification of an endpoint device, according to various embodiments. Continuing the examples previously described with respect to FIGS. 4-6, again assume that there is an endpoint device 402 that joins a network in which networking devices 406 are located.

One aspect of the flash classification approach introduced herein is a policy that is used to determine whether a device, such as endpoint device 402, is allows to trigger flash classification, in various embodiments. In one embodiment, this policy may take the form of an access list applied to any device characteristics of an endpoint, such as endpoint device 402, such as its MAC address. OUI, type of protocol that it uses, etc. In another embodiment, the policy may be governed by another engine such as a location engine (e.g., DNA Spaces by Cisco Systems. Inc. or a similar engine). For example, the user may specify that all endpoint devices located in a specific, secured building are eligible for flash classification. Other criteria may be used in a flash classification policy, as well, such as a combination of OUI, MAC address, protocol(s) in use, time of day, location, etc.

In another embodiment, which could be used for endpoint devices that are not capable of explicitly signaling a desire for to be flash classified, a local policy could be configured directly on networking devices 406 (e.g., on a router, switch, etc.), to trigger flash classification for certain types of endpoint devices on behalf of the endpoint device.

As shown, endpoint device 402 may explicitly signal a desire to trigger flash classification. To this end, endpoint device 402 may send a custom flash classification request 702 to device classification service 408 or other policy service which, in turn, determines whether endpoint device 402 is eligible for flash classification according to policy. As noted, if endpoint device 402 is not configured to explicitly send flash classification request 702, one of networking devices 406 may do so on its behalf. If endpoint device 402 does not match the flash classification policy, then flash classification request 702 may simply be ignored or a custom "negative" reply sent to the requesting device.

In cases in which endpoint device 402 is eligible for flash classification, device classification service 408 may initiate the flash collection of telemetry data regarding endpoint device 402. As would be appreciated, probing of an endpoint device (e.g., the collection of data regarding endpoint 402) for purposes of device classification is typically performed opportunistically in a network from various sources, leading to different characteristics/features being collected, asynchronously. In contrast, the collection of telemetry data regarding endpoint 402 may be performed by actively probing endpoint device 402, in flash classification mode. To do so, device classification service 408 may send one or more active probing instructions 704 to networking devices 406, to initiate active probing 706 of endpoint device 402.

Active probing 706 of endpoint device 402 may take various forms, depending on the implementation. In some embodiments, this active data collection may entail capturing the DHCP vendor class of endpoint device 402, assessing its open ports through port scanning, or the like. For instance, active probing instruction 702 may trigger a networking device 406 to initiate NMAP port scanning of endpoint device 402 on the fly. In further embodiments, active probing instruction 704 may instruct networking devices 406 to capture packets sent by endpoint device 402 for analysis, such as via deep packet inspection (DPI). In some cases, any captured packets could also be anonymized as specified by policy (e.g., if OUI=X, protocol used are P1, P2 then fast classification is permitted and active probing is permitted with NMAP port scan, packet capture applied to traffic matching specific criterion, etc.). In yet another embodiment, active probing instruction 704 may instruct networking devices 406 to send a FORCERENEW DHCP message to endpoint device 402, forcing it into a renew state, so that its DHCP class ID can be captured.

The telemetry data captured regarding endpoint device 402 may then be aggregated by networking devices 406 and sent to device classification service 408 via flash probing response 708. Alternatively, networking devices 406 may begin streaming the collected data to device classification service 408 for flash classification.

Once device classification service 408 has received the telemetry data regarding endpoint device 402 via flash probing response 708, it may determine whether the telemetry data regarding endpoint device 402 matches any of the existing device classification rules maintained by device classification service 408. Such rule matching may be performed using rules associated with the specific network in which endpoint device 402 is located or across any number of networks serviced by device classification service 408. If no existing rules match, device classification service 408 may leverage machine learning in an attempt to increase the change of successful classification of endpoint device 402.

In some instances, device classification service 408 may assess whether the telemetry data regarding endpoint device 402 matches any device classification rules on a "good enough" basis. For instance, device classification service 408 may leverage several criteria to define the quality of the matching rule, such as its number of dimensions or conditions for classification, the number of conflicts between that rule and other device classification rules, or other properties of the rule itself. In such cases, the matching rule may be presented to a user via UI(s) 516 and other information, such as the number of other devices in other networks that match the rule, or the like.

Conversely, if no existing device classification rules match the telemetry data regarding endpoint device 402, device classification service 408 may generate a new device classification rule on the fly that assigns a device type to endpoint device 402. To do so, in part, device classification service 408 may perform a labeling exchange 710 with UI(s) 516 by requesting that a user provide a label for the device type of endpoint device 402.

Device classification service 408 may employ special techniques to generate the device classification rule for endpoint device 402. Indeed, unlike the clustering approach described previously where a minimum number of devices can be set, there may be very few devices that are similar to endpoint device 402. In extreme cases, endpoint device 402 may be the only device on the network of its type. This can lead to classical machine learning issues, such as overfitting, particularly in the extreme case of having only a single data point on the positive class and all other data points being in the negative class. What this means is that device classification service 408 may generate a very specific rule (e.g., not generalizing well) for the one endpoint device requesting flash classification. To fight the imbalance, device classification service 408 may perform any or all of the following:

- When training a device classification rule against regular clusters with multiple endpoints, device classification service 408 may extract which attributes are usually selected. This is a form of system-level "feature importance" that captures attributes that tend to be amenable to generalization.
- When training the flash classification, device classification service 408 can then restrict the rule training process to use only the attributes with high system-level feature importance and/or reweight the features in the training based on their importance measures. This allows device classification service 408 to propose rules to UI(s) 516 that are based on attributes that will generalize better, as opposed to a very specific rules based on one end point.
- In another embodiment, the generated device classification rule may simply be conditioned on the MAC address of endpoint device 402 and act as an inventory mapping this precise MAC to a given classification. Although this does not generalize, it may still be the best option when training an actual device classification rule based on one endpoint is not feasible.
- According to a policy, device classification service 408 may also make a tradeoff as to whether to reuse an existing device classification rule or generate a new rule that can be adjusted in the case of flash classification. Indeed, the user of UI(s) 516 may increase the minimum required quality for machine learning-generated rule applied to flash classification, e.g., in order to explicitly create new high-quality rules for such devices. Conversely, the user may request that device classification service 408 lower the minimum quality required so as to increase the chance to find an existing rule matching endpoint device 402 and, thus, speed up the classification process.

In various embodiments, device classification service 408 may expand its search to similar unknown devices in the network. Indeed, such unknown devices being flagged as eligible for flash classification are usually highly critical. The process may be eased by trying to locate similar unknown devices in the network. More specifically, using the set of probes gathered from a first unknown device, device classification service 408 may compute an access list so as to precisely match similar devices in the network (e.g., Protocol used is P1, P2, P3, DHCP Class IS=D1, traffic profile, etc.). Such an access list is then broadcasted to networking devices 406 to quickly identify similar unknown devices. On detection of a similar unknown device, in a second step, the same fast probing mechanism may be activated so as to gather even more information (probes), to ease the task of classifying those unknown devices. Doing so can actually help to improve the quality of classification for such devices, as opposed to solely speeding up the classification process.

In further embodiments, the number of flash classification request received from an endpoint device can be monitored and assessed to detect denial of service (DoS) attacks. For instance, if multiple requests are received from an endpoint device and denied by policy, the requesting endpoint device may be blacklisted for a given period of time using some form of hysteresis. In more complex embodiments, this mechanism may block an entire region of the network (e.g., a whole floor of a building) if many requests are received by different devices in this area and denied. Indeed, such requests could be performed by a single attacker that is spoofing its MAC address. Whenever such a request is blocked, the network operator may also be alerted via UI(s) 516 and may opt to override this blocking, so as to allow for further requests (e.g., in the case of a large rollout of new devices).

Figure 8:
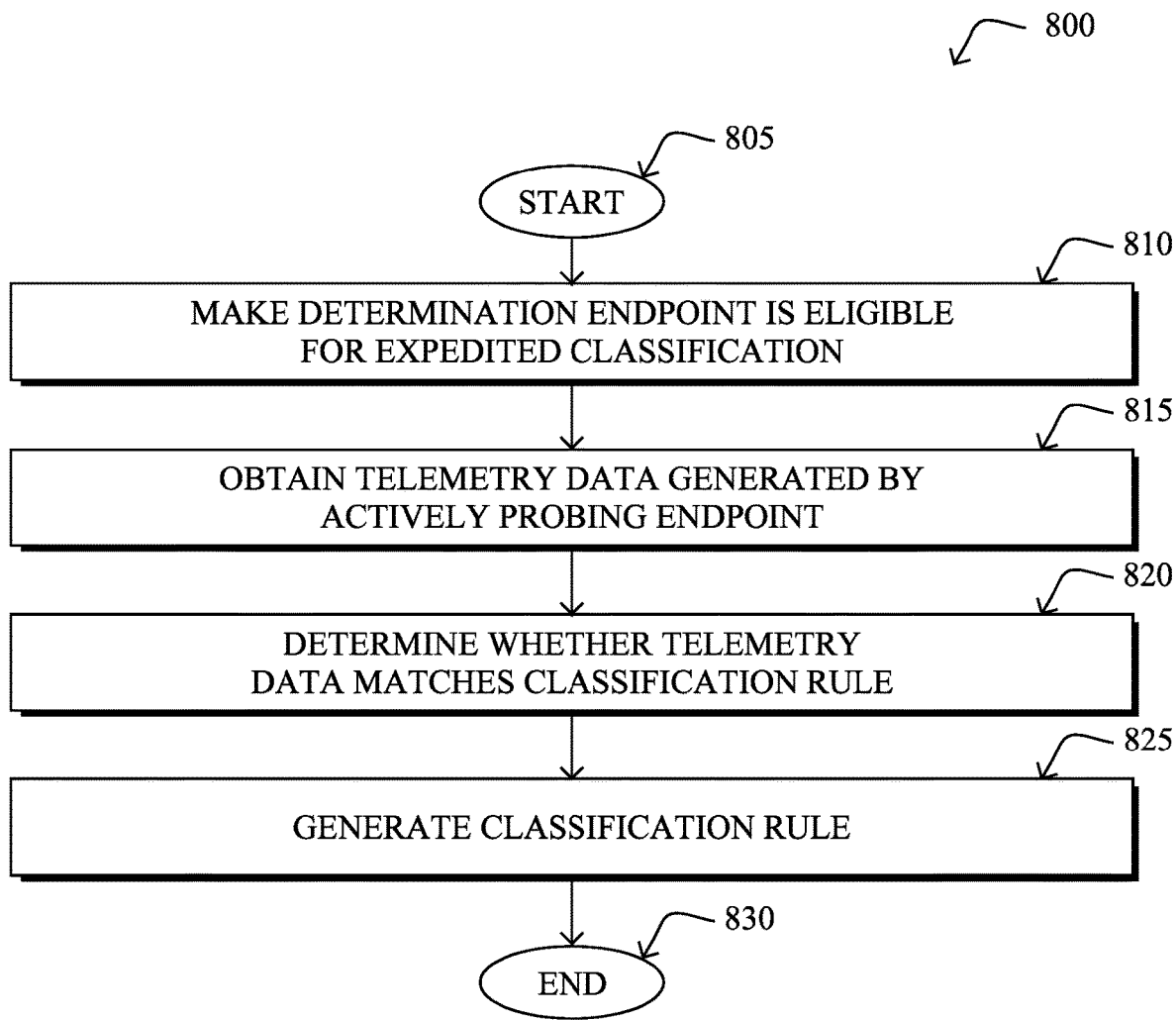
FIG. 8 illustrates an example simplified procedure for the flash classification of an endpoint device.

FIG. 8 illustrates an example simplified procedure for the flash classification of an endpoint device, in accordance with one or more embodiments described herein. For example, a non-generic, specifically configured apparatus (e.g., device 200) may perform procedure 800 by executing stored instructions (e.g., device classification process 248), to operate as a device classification service for one or more networks. The procedure 800 may start at step 805, and continues to step 810, where, as described in greater detail above, the device classification service may make a determination that an endpoint device in a network is eligible for expedited device classification based on a policy. In various embodiments, the policy may specify one or more of: a (MAC address of the endpoint device, an OUI of the endpoint device, a location of the endpoint device, a protocol used by the endpoint device, combinations thereof, or the like. In some embodiments, the service may determine that the endpoint device is eligible for expedited classification in response to receiving an indication of a request for expedited device classification sent by the endpoint device. In further embodiments, the service may also determine whether the request is part of a denial of service attack on the device classification service.

At step 815, as detailed above, the device classification service may obtain, after making the determination that the endpoint device in the network is eligible for expedited device classification, telemetry data regarding the endpoint device generated by actively probing the endpoint device. Such active probing of the endpoint device may entail one or more of: performing a port scan of the endpoint device, capturing packets sent by the endpoint device, or forcing a DHCP renewal by endpoint device, so as to capture its DHCP class ID. This can be achieved, for instance, by sending proper instructions to one or more networking devices in the network to which the endpoint device is attached (e.g., to a switch, a router, etc.).

At step 820, the device classification service may determine whether the telemetry data regarding the endpoint device matches any existing device classification rules, as described in greater detail above. Such rule may include any number of conditions that, if satisfied, apply a device type label to the endpoint device.

At step 825, as detailed above, the device classification service may generate, based on the telemetry data, a device classification rule that assigns a device type to the endpoint device, when the telemetry data does not match any existing device classification rules. In some embodiments, the service may do so by determining measures of importance for features on which the existing device classification rules are based and using the measures of importance to select one or more of the features as conditions for the device classification rule, based on their measures of importance. In another embodiment, the service may do so by conditioning the device classification rule on a media access control (MAC) address of the endpoint device. This may be the ultimate outcome if, for instance, there are no endpoints that are similar to the endpoint device available. In yet another embodiment, the service may identify a set of endpoints in the network that are of unknown device types, based on the telemetry data regarding the endpoint device, obtain telemetry data regarding the set of endpoints generated by actively probing the set of endpoints, and apply clustering to the telemetry data regarding the endpoint device and the telemetry data regarding the set of endpoints, to form a device cluster from which the device classification rule is extracted. By assigning a device type to the endpoint device, a network policy can then be applied to the endpoint device, based on its type. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for flash/expedited device type classification in a network. In contrast to approaches that rely on the passive or opportunistic collection of telemetry data regarding an endpoint, the techniques herein also introduce mechanisms to actively probe the endpoint, so as to quickly classify the endpoint. In addition, the techniques herein introduce approaches to handle situations in which the resulting telemetry data does not match an existing device classification rule, to generate a new device classification rule.

While there have been shown and described illustrative embodiments that provide for flash classification using machine learning for device classification systems, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    determining, by a device classification service configured to classify an endpoint device in a network according to network traffic associated with the endpoint device, whether the endpoint device in a network is eligible for an expedited device classification or a non-expedited device classification based on a policy;
    obtaining, by the device classification service and after determining that the endpoint device is eligible for the expedited device classification, telemetry data regarding the endpoint device generated by actively probing the endpoint device;
    determining, by the device classification service, whether the telemetry data regarding the endpoint device matches any existing device classification rules; and
    generating, by the device classification service and based on the telemetry data, a device classification rule that assigns a device type to the endpoint device, when the telemetry data does not match any existing device classification rules.

2. The method as in claim 1, wherein determining whether the endpoint device in the network is eligible for an expedited device classification or a non-expedited device classification based on a policy comprises:
    receiving an indication of a request for the expedited device classification sent by the endpoint device.

3. The method as in claim 2, further comprising:
    determining whether the request is part of a denial of service attack on the device classification service.

4. The method as in claim 1, wherein the policy specifies one or more of: a media access control (MAC) address of the endpoint device, an organizationally unique identifier (OUI) of the endpoint device, a location of the endpoint device, or a protocol used by the endpoint device.

5. The method as in claim 1, wherein generating the device classification rule comprises:
    determining measures of importance for features on which the existing device classification rules are based; and
    using the measures of importance to select one or more of the features as conditions for the device classification rule, based on their measures of importance.

6. The method as in claim 1, wherein generating the device classification rule comprises:
    conditioning the device classification rule on a media access control (MAC) address of the endpoint device.

7. The method as in claim 1, wherein actively probing the endpoint device comprises one or more of: performing a port scan of the endpoint device, capturing packets sent by the endpoint device, or forcing a Dynamic Host Configuration Protocol (DHCP) renewal by endpoint device.

8. The method as in claim 1, wherein generating the device classification rule comprises:
    identifying a set of endpoints in the network that are of unknown device types, based on the telemetry data regarding the endpoint device;
    obtaining telemetry data regarding the set of endpoints generated by actively probing the set of endpoints; and applying clustering to the telemetry data regarding the endpoint device and the telemetry data regarding the set of endpoints, to form a device cluster from which the device classification rule is extracted.

9. The method as in claim 1, wherein the expedited device classification is configured to classify the endpoint device according to its device type more quickly than the non-expedited device classification by actively probing the endpoint device for the telemetry data.

10. An apparatus, comprising:
one or more network interfaces;
a processor coupled to the one or more network interfaces and configured to execute one or more processes; and
a memory configured to store a process that is executable by the processor, the process when executed configured to:
determine whether an endpoint device in a network is eligible for an expedited device classification or a non-expedited device classification based on a policy;
obtain, after determining that the endpoint device is eligible for the expedited device classification, telemetry data regarding the endpoint device generated by actively probing the endpoint device;
determine whether the telemetry data regarding the endpoint device matches any existing device classification rules; and
generate, based on the telemetry data, a device classification rule that assigns a device type to the endpoint device, when the telemetry data does not match any existing device classification rule,
wherein the apparatus is a device classification service configured to classify the endpoint device according to network traffic associated with the endpoint device.

11. The apparatus as in claim 10, wherein the apparatus determines whether the endpoint device in the network is eligible for an expedited device classification or a non-expedited device classification based on a policy by:
receiving an indication of a request for the expedited device classification sent by the endpoint device.

12. The apparatus as in claim 11, wherein the process when executed is further configured to:
determine whether the request is part of a denial of service attack.

13. The apparatus as in claim 10, wherein the policy specifies one or more of: a media access control (MAC) address of the endpoint device, an organizationally unique identifier (OUI) of the endpoint device, a location of the endpoint device, or a protocol used by the endpoint device.

14. The apparatus as in claim 10, wherein the apparatus generates the device classification rule by:
determining measures of importance for features on which the existing device classification rules are based; and
using the measures of importance to select one or more of the features as conditions for the device classification rule, based on their measures of importance.

15. The apparatus as in claim 10, wherein the apparatus generates the device classification rule by:
conditioning the device classification rule on a media access control (MAC) address of the endpoint device.

16. The apparatus as in claim 10, wherein actively probing the endpoint device comprises one or more of: performing a port scan of the endpoint device, capturing packets sent by the endpoint device, or forcing a Dynamic Host Configuration Protocol (DHCP) renewal by endpoint device.

17. The apparatus as in claim 10, wherein the apparatus generates, the device classification rule by:
identifying a set of endpoints in the network that are of unknown device types, based on the telemetry data regarding the endpoint device;
obtaining telemetry data regarding the set of endpoints generated by actively probing the set of endpoints; and
applying clustering to the telemetry data regarding the endpoint device and the telemetry data regarding the set of endpoints, to form a device cluster from which the device classification rule is extracted.

18. The apparatus as in claim 10, wherein the expedited device classification is configured to classify the endpoint device according to its device type more quickly than the non-expedited device classification by actively probing the endpoint device for the telemetry data.

19. A tangible, non-transitory, computer-readable medium storing program instructions that cause a device classification service to execute a process comprising:
determining, by the device classification service, which is configured to classify an endpoint device in a network according to network traffic associated with the endpoint device, whether the endpoint device is eligible for an expedited device classification or a non-expedited device classification based on a policy;
obtaining, by the device classification service and after determining that the endpoint device is eligible for the expedited device classification, telemetry data regarding the endpoint device generated by actively probing the endpoint device;
determining, by the device classification service, whether the telemetry data regarding the endpoint device matches any existing device classification rules; and
generating, by the device classification service and based on the telemetry data, a device classification rule that assigns a device type to the endpoint device, when the telemetry data does not match any existing device classification rules.

20. The computer-readable medium as in claim 19, wherein determining whether the endpoint device is eligible for an expedited device classification or a non-expedited device classification based on a policy comprises:
receiving an indication of a request for the expedited device classification sent by the endpoint device.

* * * * *

UNITED STATES PATENT AND TRADEMARK OFFICE
CERTIFICATE OF CORRECTION

PATENT NO. : 11,349,716 B2
APPLICATION NO. : 16/878780
DATED : May 31, 2022
INVENTOR(S) : Jean-Philippe Vasseur et al.

It is certified that error appears in the above-identified patent and that said Letters Patent is hereby corrected as shown below:

In the Specification

Column 13, Line 45, please replace as shown:
device 402, such as its MAC address, OUI, type of protocol Column 13, Line 48, please replace as shown:
DNA Spaces by Cisco Systems, Inc. or a similar engine). For Column 18, Line 14, please amend as shown:
Whether the endpoint device is eligible for Signed and Sealed this
Thirtieth Day of August, 2022

Katherine Kelly Vidal
*Director of the United States Patent and Trademark Office*